(12) United States Patent
Hayashi et al.

(10) Patent No.: US 6,918,289 B2
(45) Date of Patent: Jul. 19, 2005

(54) AIR PRESSURE INFORMATION DISPLAY DEVICE OF VEHICLE TIRE

(75) Inventors: Toshio Hayashi, Hiroshima-ken (JP); Fumitaka Andou, Hiroshima-ken (JP); Kazufumi Adachi, Hiroshima-ken (JP); Kiyoshi Sakamoto, Chiba-ken (JP); Atsushi Okamitsu, Hiroshima-ken (JP); Tsukasa Harada, Hiroshima-ken (JP)

(73) Assignee: Mazda Motor Corporation, Hiroshima (JP)

(*) Notice: Subject to any disclaimer, the term of this patent is extended or adjusted under 35 U.S.C. 154(b) by 30 days.

(21) Appl. No.: 10/279,002

(22) Filed: Oct. 24, 2002

(65) Prior Publication Data

US 2003/0120453 A1 Jun. 26, 2003

(30) Foreign Application Priority Data

Oct. 24, 2001 (JP) ........................................ 2001-325818

(51) Int. Cl.$^7$ ............................................. G01M 17/02
(52) U.S. Cl. ........................................................ 73/146
(58) Field of Search ................................ 73/146, 146.2, 73/146.3, 146.4, 146.5, 146.8; 340/440, 442, 448

(56) References Cited

U.S. PATENT DOCUMENTS

| 4,348,654 A | * | 9/1982 | Matsuda et al. ............ 340/448 |
| 4,909,074 A | | 3/1990 | Gerresheim et al. |
| 5,629,873 A | | 5/1997 | Mittal et al. |
| 6,034,596 A | | 3/2000 | Smith et al. |
| 6,275,148 B1 | * | 8/2001 | Takamura et al. .......... 340/442 |
| 2003/0058089 A1 | * | 3/2003 | Ruehr et al. ............... 340/442 |
| 2003/0128109 A1 | * | 7/2003 | Andou et al. ............... 340/442 |

FOREIGN PATENT DOCUMENTS

| EP | 791 488 A1 | 8/1997 |
| JP | 10-508264 | 8/1998 |
| WO | WO 94/20317 | 9/1994 |
| WO | WO 96/15919 | 5/1996 |

* cited by examiner

*Primary Examiner*—Michael Cygan
*Assistant Examiner*—Andre Allen

(57) ABSTRACT

An air pressure information display device of a vehicle tire has a normal air pressure storage module (10a) for storing a normal air pressure of a tire corresponding to a tire temperature, an excessive/deficient amount detection module (10b) for detecting the excessive/deficient amount from the normal air pressure on the basis of the stored normal air pressure, and air pressure information detected by an air pressure information detection module (6–9), and a display control module (10c) for controlling a display (11) to display the detected excessive/deficient amount. Hence, since the user is informed of the excessive/deficient amount from the normal air pressure, he or she can appropriately determine an air pressure state of a tire even when he or she does not recognize the normal air pressure.

11 Claims, 15 Drawing Sheets

---

TIRE PRESSURE CONDITION

- MEASURED AIR PRESSURE     245 KPa
- EXCESSIVE/DEFICIENT AMOUNT     −30 KPa

FIG. 2

TIRE PRESSURE CONDITION

· EXCESSIVE/DEFICIENT AMOUNT     −30 KPa

FIG. 3

TIRE PRESSURE CONDITION

- MEASURED AIR PRESSURE 245 KPa
- EXCESSIVE/DEFICIENT AMOUNT −30 KPa

FIG. 4

TIRE PRESSURE CONDITION

- NORMAL AIR PRESSURE            275 KPa
- EXCESSIVE/DEFICIENT AMOUNT     −30 KPa

FIG. 5

TIRE PRESSURE CONDITION

- NORMAL AIR PRESSURE             275 KPa
- MEASURED AIR PRESSURE           245 KPa
- EXCESSIVE/DEFICIENT AMOUNT      −30 KPa

F I G. 10
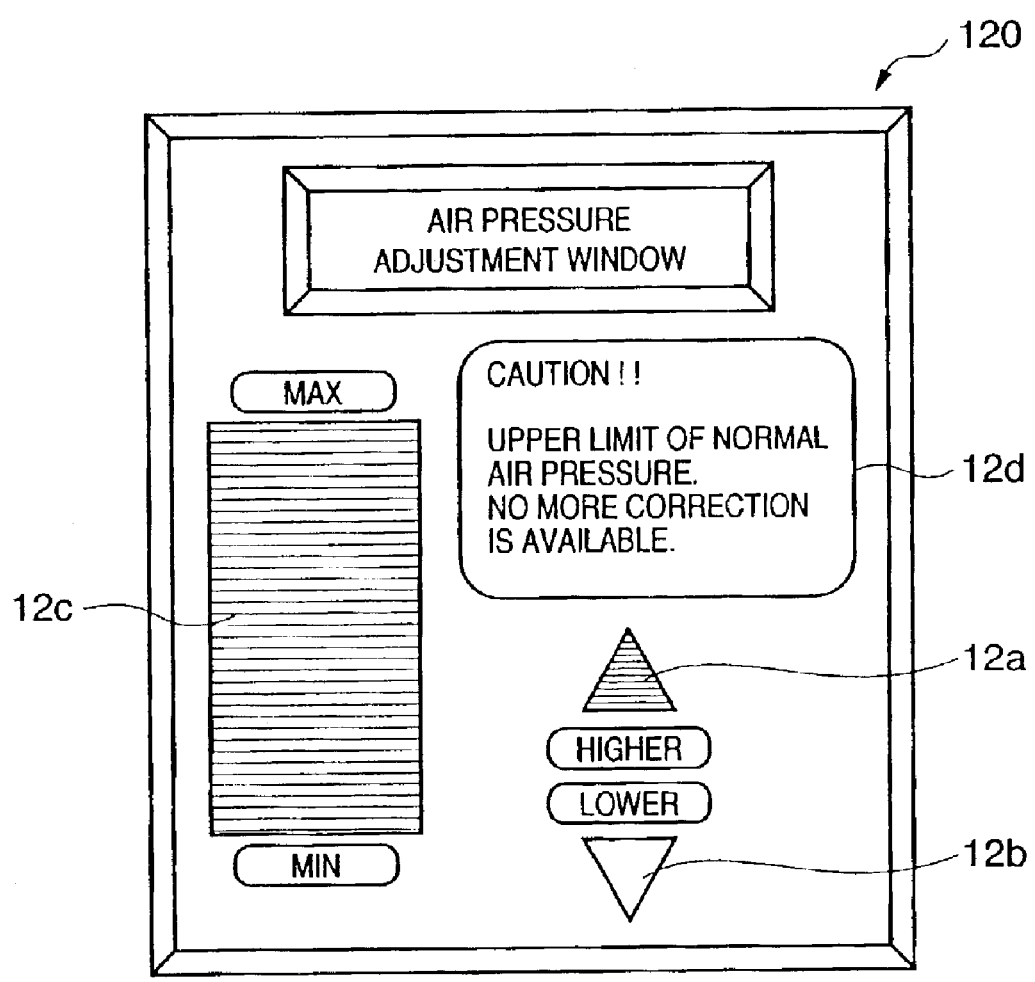

FIG. 11

| | |
|---|---|
| TIRE PRESSURE CONDITION | |
| · NORMAL AIR PRESSURE | 275 KPa |
| · AIR PRESSURE CORRECTION | RELATIVELY HIGHER PRESSURE IS CURRENTLY SET |
| · EXCESSIVE/DEFICIENT AMOUNT | −30 KPa |

TIRE PRESSURE CONDITION

- MEASURED AIR PRESSURE     245 KPa
- TIRE TEMPERATURE     55 °C
- EXCESSIVE/DEFICIENT AMOUNT     −30 KPa

TIRE TEMPERATURE IS TOO HIGH.
PLEASE HOLD TO PUMP AIR IN TIRE
UNTIL TIRE TEMPERATURE LOWERS

160

AIR PRESSURE INFORMATION DISPLAY DEVICE OF VEHICLE TIRE

FIELD OF THE INVENTION

The present invention relates to an air pressure information display device of a vehicle tire and, more particularly, to an air pressure information display device which can appropriately display air pressure information of a vehicle tire to the user.

BACKGROUND OF THE INVENTION

Conventionally, a technique for detecting the air pressure of a vehicle tire, and informing the user of the detected air pressure (to be referred to as a measured air pressure hereinafter) as a tire air pressure state is known.

Note that a normal user recognizes a normal air pressure based on the description of a sticker or the like, which is adhered in the vicinity of a vehicle door or the like. In such description, the normal air pressure is that at ambient temperature regardless of the tire inner temperature.

On the other hand, since the tire inner air temperature varies under various influences such as a change in temperature around a vehicle, a temperature rise of a rim upon braking during traveling, and the like, the tire inner air pressure also varies in correspondence with variations of the tire inner air temperature.

Therefore, since the conventional description of the sticker or the like indicates only the measured air pressure that does not consider any tire inner temperature, it is difficult for the user who recognizes only the normal air pressure at ambient temperature to determine if the indicated air pressure is higher or lower than the normal air pressure.

Hence, Japanese translation of PCT publication No. 10-508264 discloses a technique for correcting the air pressure signal of a tire detected by a pressure sensor in association with a standard temperature (20° C.), and displaying the corrected air pressure signal on a display of a vehicle.

However, in the aforementioned prior art, the display of the vehicle and an external air pressure gauge of an air pump or the like indicate different air pressures, and the user may become confused.

More specifically, in the aforementioned prior art, when the air pressure, which is corrected in association with the standard temperature, is lower than a normal air pressure, the display of the vehicle displays that lower air pressure. For this reason, the user may pump air in a tire to raise the air pressure to a normal value according to the displayed contents.

However, when the tire temperature is high, although the air pressure displayed on the display of the vehicle is low, the actual air pressure becomes higher than the normal air pressure due to the high tire temperature in such case, and an air pressure gauge of an air pump indicates an air pressure higher than the normal air pressure. That is, since the display of the vehicle and the air pressure gauge of the air pump indicate different air pressures, the user may wonder whether or not to pump in air.

SUMMARY OF THE INVENTION

The present invention has been proposed to solve the conventional problems, and has as its object to provide an air pressure information display device of a vehicle tire, which displays an appropriate air pressure, thus guiding the user to appropriately pump air in a tire, and assuring an appropriately managed state of the tire air pressure.

In order to achieve the above object, an air pressure information display device of a vehicle tire according to the present invention adopts the following solution.

That is, in order to achieve the above object, the first arrangement of the present invention is an air pressure information display device of a vehicle tire, which comprises detection means, attached to a vehicle tire, for detecting tire air pressure information that contains a tire temperature and measured air pressure, and displays information associated with an air pressure of the tire on the basis of the air pressure information detected by the detection means, comprising:

storage means for storing a normal air pressure of a tire corresponding to a temperature of the tire;

calculation means for calculating an excessive/deficient amount from the normal air pressure on the basis of a relationship between the normal air pressure stored in the storage means and the air pressure information detected by the detection means; and display control means for controlling display means to display the excessive/deficient amount calculated by the calculation means.

According to the first arrangement of the present invention, since an excessive/deficient amount from the normal air pressure is displayed, the user can appropriately determine an air pressure state of a tire even when he or she does not recognize the normal air pressure.

Also, since the user can determine based on the displayed excessive/deficient amount from the normal air pressure if he or she must pump air in a tire, irrespective of the tire temperature, the user can be prevented from being confused.

In the second arrangement, the display control means controls the display means to display the measured air pressure detected by the detection means and the normal air pressure stored in the storage means in addition to the excessive/deficient amount calculated by the calculation means.

According to the second arrangement of the present invention, since the measured or normal air pressure is displayed in addition to the excessive/deficient amount from the normal air pressure, the user can recognize all of the excessive/deficient amount, measured air pressure, and normal air pressure on the basis of the relationship between the excessive/deficient amount and at least one of the measure air pressure and normal air pressure, and can determine an air pressure state of a tire more appropriately, even when he or she does not recognize the normal air pressure.

In order to achieve the above object, the third arrangement of the present invention is an air pressure information display device of a vehicle tire, which comprises detection means, attached to a vehicle tire, for detecting tire air pressure information that contains a tire temperature and measured air pressure, and displays information associated with an air pressure of the tire on the basis of the air pressure information detected by the detection means, comprising:

storage means for storing a normal air pressure of a tire corresponding to a temperature of the tire, and display control means for controlling display means to display the measured air pressure detected by the detection means, and an allowable range of the normal air pressure stored in the storage means on a graph defined by the tire temperature and air pressure as parameters.

According to the third arrangement of the present invention, since the normal air pressure allowable range and measured air pressure are displayed on the graph, the user can easily confirm the excessive/deficient state of the air pressure from the relationship between the normal air pressure allowable range and measured air pressure on the graph, and can easily determine an air pressure state of a tire.

The fourth arrangement of the present invention further comprises calculation means for calculating an excessive/deficient amount from the normal air pressure on the basis of a relationship between the normal air pressure stored in the storage means and the air pressure information detected by the detection means, and the display control means controls the display means to display the excessive/deficient amount calculated by the calculation means on a graph defined by the tire temperature and air pressure as parameters in addition to display of the normal air pressure allowable range and measured air pressure.

According to the fourth arrangement of the present invention, since the excessive/deficient amount is displayed on the graph in addition to the normal air pressure allowable range and measured air pressure, the user can easily confirm the normal air pressure allowable range, measured air pressure, and excessive/deficient amount on the graph, and can easily determine an air pressure state of a tire.

In the fifth arrangement of the present invention, the detection means detects the tire air pressure information that contains the tire temperature and measured air pressure for each tire, and the display control means controls the display means to display the excessive/deficient amount calculated by the calculation means, and tire position information indicating a position of a tire where that excessive/deficient amount is detected.

According to the fifth arrangement of the present invention, since the excessive/deficient amount and tire position information are simultaneously displayed, a tire that requires adjustment of the air pressure can be quickly determined.

The sixth arrangement of the present invention further comprises correction means for correcting the normal air pressure stored in the storage means or the excessive/deficient amount calculated by the calculation means in accordance with a user's requirement.

According to the sixth arrangement of the present invention, for example, when the user requires to raise the air pressure by a predetermined pressure upon traveling on an expressway, since the normal air pressure or excessive/deficient amount is also corrected according to that requirement, air pressure information according to the user's requirement can be provided.

In the seventh arrangement of the present invention, the correction means limits the corrected air pressure to fall within a predetermined range.

According to the seventh arrangement of the present invention, since correction of the air pressure is limited to fall within the predetermined range, too high or low an air pressure can be prevented from being set.

The eighth arrangement of the present invention further comprises correction means for automatically or manually correcting the normal air pressure stored in the storage means in accordance with a travel environment of a vehicle.

According to the eighth arrangement of the present invention, the normal air pressure can be adjusted to an appropriate value according to the travel environment of a vehicle, e.g., the type of road (open road, expressway), road surface condition, and the like.

In order to achieve the above object, the ninth arrangement of the present invention is an air pressure information display device of a vehicle tire, which comprises detection means, attached to a vehicle tire, for detecting tire air pressure information that contains a tire temperature and measured air pressure, and displays information associated with an air pressure of the tire on the basis of the air pressure information detected by the detection means, comprising:

display control means for controlling display means to display information that keeps off the user from pumping air in a tire when the measured air pressure detected by the detection means is deficient from the normal air pressure and when the tire temperature detected by the detection means is not less than a predetermined temperature.s In the aforementioned prior art, when air pressure information corrected to an air pressure at a standard temperature is displayed, if the tire temperature is higher than the standard temperature, an air pressure displayed on the display of the vehicle is lower than the normal air pressure due to temperature compensation, although the actual air pressure is high. Hence, since the air pressure displayed on the display of the vehicle is different from the actual air pressure measured by an external indicator such as an air pressure gauge of an air pump, the user may be confused whether or not to pump air in a tire.

By contrast, according to the ninth arrangement of the present invention, when the tire temperature is high, information indicating that it is inappropriate to pump air in a tire is displayed and, hence, user's air pump operation itself can be suppressed. Therefore, since the user need not recognize the air pressure using an external indicator such as an air pressure gauge of an air pump or the like, he or she can be prevented from being confused as to whether or not to pump air in a tire due to different air pressure states indicated on the display of the vehicle and the external indicator.

That is, since any of the aforementioned arrangements of the present invention can provide an air pressure information display device of a vehicle tire that can appropriately display an air pressure, the device can guide the user to appropriately pump air in a tire, thus surely managing the tire air pressure.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows a display example according to the first embodiment;

FIG. 3 shows a display example according to the second embodiment;

FIG. 4 shows a display example according to the third embodiment;

FIG. 5 shows a display example according to the fourth embodiment;

FIG. 10 shows an example of an air pressure adjustment window according to the eighth embodiment;

FIG. 11 shows a display example according to the ninth embodiment;

DETAILED DESCRIPTION OF THE PREFERRED EMBODIMENTS

Preferred embodiments of the present invention will now be described in detail in accordance with the accompanying drawings.

Figure 1:
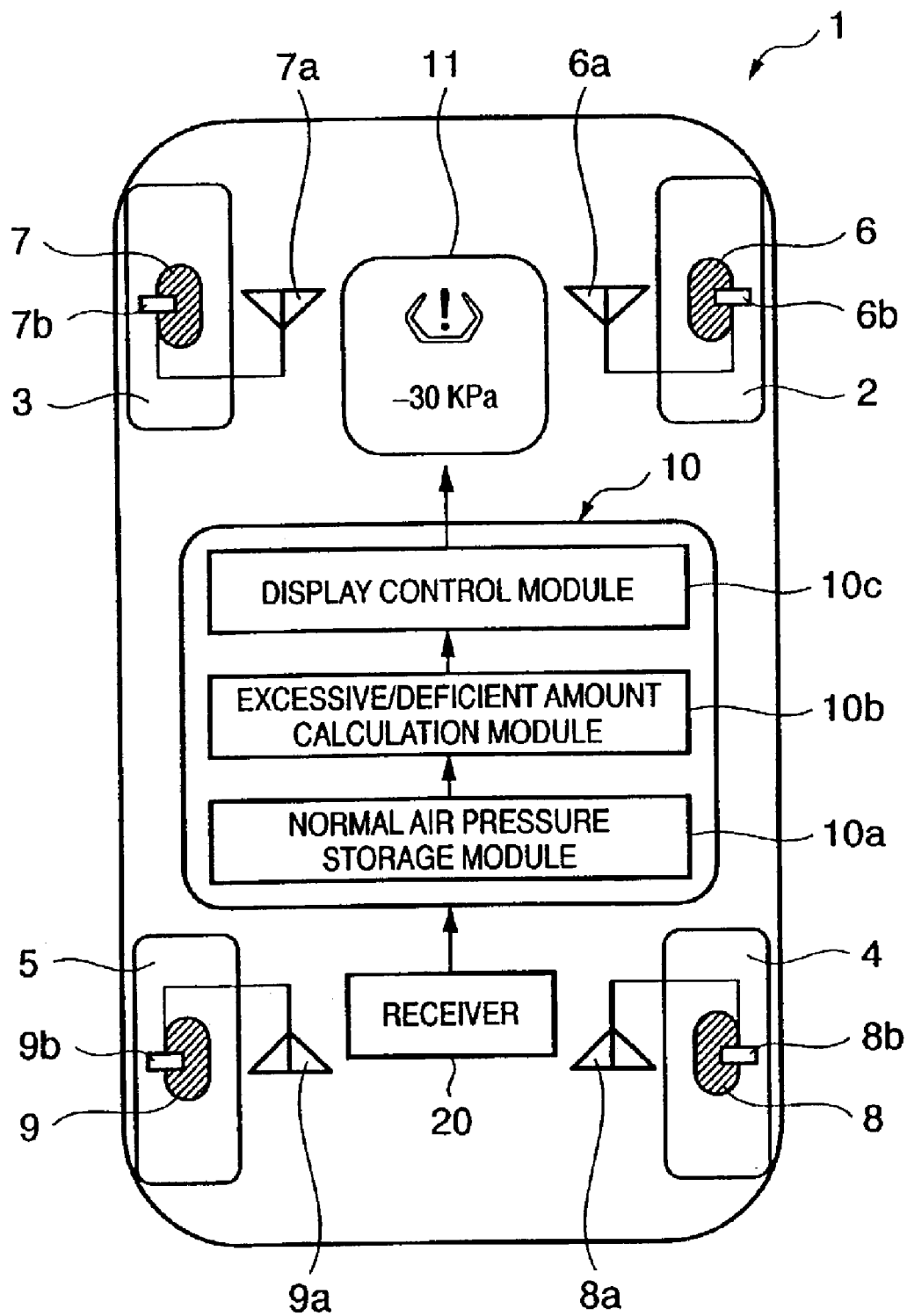
FIG. 1 is a view showing an example of the overall arrangement according to the first to sixth embodiments.

FIG. 1 shows an example of the overall arrangement according to the first to seventh embodiments. Referring to FIG. 1, a vehicle 1 has tires 2 to 5, which respectively comprise air pressure sensors 6 to 9. The air pressure sensors 6 to 9 can detect not only an air pressure but a tire temperature.

The air pressure sensors 6 to 9 respectively comprise transmitters 6b to 9b and antennas 6a to 9a, and the air pressure (to be referred to a measured air pressure hereinafter) and tire temperature detected by the air pressure sensors are output to a control unit 10 via wireless communications.

In this embodiment, the transmitter and antenna are equipped in correspondence with each air pressure sensor, but data of the respective air pressure sensors may be sent using only one set of transmitter and antenna.

The control unit 10 implements functions of respective modules to be described below by executing operation instructions of a software program, which is prepared in advance to display air pressure information of a vehicle tire, using a CPU (central processing unit; not shown).

Note that the modules are predetermined function units implemented by the software program and hardware, and the control unit 10 shown in FIG. 1 is comprised of:

normal air pressure storage module 10a that stores a normal air pressure corresponding to a tire temperature;

an excessive/deficient amount calculation module 10b for calculating the excessive/deficient amount of an air pressure on the basis of the difference between the measured air pressure detected by the air pressure sensors 6 to 9, and the corresponding normal air pressure stored in the normal air pressure storage module 10a; and a display control module 10c for controlling a display 11 to display the excessive/deficient amount calculated by the excessive/deficient amount calculation module 10b.

Also, a receiver 20 which receives radio signals sent from the antennas 6a to 9a of the air pressure sensors 6 to 9 and demodulates them to information in a format that the control unit 10 can read is connected to the control unit 10.

Note that the display 11 may use, e.g., a display screen of a navigation system, or may have a dedicated display on an instrument panel.

The control unit 10 may adopt, e.g., a control unit of a car navigation system.

(First Embodiment)

FIG. 2 shows a display example according to the first embodiment. According to the first embodiment, an excessive/deficient amount, which is calculated based on the measured air pressure detected by the air pressure sensors 6 to 9 and the normal air pressure stored in the normal air pressure storage module 10a, is displayed on the display 11.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The excessive/deficient amount calculated by the excessive/deficient amount calculation module 10b is supplied to the display control module 10c, which makes the display 11 display that excessive/deficient amount (−30 KPa), as shown in FIG. 2.

Therefore, according to the first embodiment, the user can appropriately determine the air pressure information of a tire since he or she can recognize the excessive/deficient amount based on the information contents displayed on the display 11, as shown in FIG. 2, even when he or she does not recognize the normal air pressure of a tire.

(Second Embodiment)

FIG. 3 shows a display example according to the second embodiment. According to the second embodiment, the display 11 simultaneously displays the measured air pressure detected by the air pressure sensors 6 to 9, and the excessive/deficient amount calculated based on the difference between that measured air pressure and normal air pressure stored in the normal air pressure storage module 10a.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The measured air pressure detected by the air pressure sensors 6 to 9, and the excessive/deficient amount calculated by the excessive/deficient amount calculation module 10b are supplied to the display control module 10c, which makes the display 11 display the measured air pressure (245 KPa) and excessive/deficient amount (−30 KPa).

Therefore, according to the second embodiment, the user can appropriately determine the air pressure information of a tire since he or she can recognize the excessive/deficient amount and measured air pressure based on the information contents displayed on the display 11, as shown in FIG. 3, even when he or she does not recognize the normal air pressure of a tire.

(Third Embodiment)

FIG. 4 shows a display example according to the third embodiment. According to the third embodiment, the display 11 simultaneously displays a normal air pressure, and the excessive/deficient amount calculated based on the difference between the measured air pressure detected by the air pressure sensors 6 to 9, and the normal air pressure stored in the normal air pressure storage module 10a.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The normal air pressure read out from the normal air pressure storage module 10a, and the excessive/deficient amount calculated by the excessive/deficient amount calculation module 10b are supplied to the display control module 10c, which makes the display 11 display the normal air pressure (275 KPa) and excessive/deficient amount (−30 KPa).

Therefore, according to the third embodiment, the user can appropriately determine the air pressure information of a tire since he or she can recognize the excessive/deficient amount and normal air pressure based on the information contents displayed on the display 11, as shown in FIG. 4, even when he or she does not recognize a normal air pressure of a tire.

(Fourth Embodiment)

FIG. 5 shows a display example according to the fourth embodiment. According to the fourth embodiment, the display 11 simultaneously displays the measured air pressure detected by the air pressure sensors 6 to 9, the normal air pressure stored in the normal air pressure storage module 10a, and the excessive/deficient amount calculated based on the difference between these measured air pressure and normal air pressure.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a.

The measured air pressure detected by the air pressure sensors 6 to 9, the normal air pressure read out from the normal air pressure storage module 10a, and the excessive/deficient amount calculated by the excessive/deficient amount calculation module 10b are supplied to the display control module 10c, which makes the display 11 display the normal air pressure (275 KPa), measured air pressure (245 KPa), and excessive/deficient amount (−30 KPa).

Therefore, according to the fourth embodiment, the user can appropriately determine the air pressure information of a tire since he or she can recognize the excessive/deficient amount, measured air pressure, and normal air pressure based on the information contents displayed on the display 11, as shown in FIG. 5, even when he or she does not recognize a normal air pressure of a tire.

(Fifth Embodiment)

Figure 6:
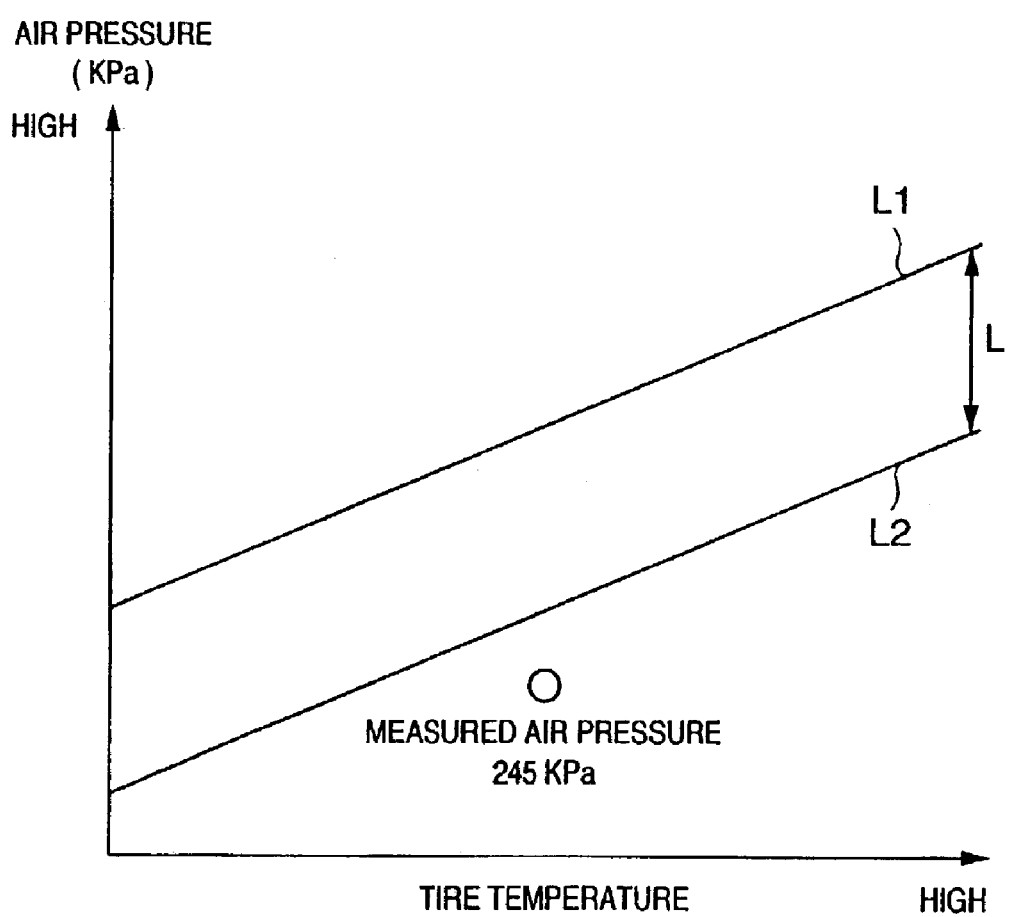
FIG. 6 shows a display example according to the fifth embodiment.

FIG. 6 shows a display example according to the fifth embodiment. According to the fifth embodiment, the display 11 displays a normal air pressure allowable range L, which is defined by normal air pressure upper and lower limit values L1 and L2, and the measured air pressure on a graph in which the abscissa plots the tire air temperature and the ordinate plots the air pressure.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. Also, a normal air pressure upper limit value L1 which is set to be higher a predetermined value than a normal air pressure corresponding to each tire temperature, a normal air pressure lower limit value L2 which is set to be lower a predetermined value than a normal air pressure corresponding to each tire temperature, and a normal air pressure allowable range L which is defined by these normal air pressure upper and lower limit values L1 and L2 are read out from the normal air pressure storage module 10a.

Then, the measured air pressure detected by the air pressure sensors 6 to 9, and the normal air pressure upper and lower limit values L1 and L2 and normal air pressure allowable range L, which are read out from the normal air pressure storage module 10a are supplied to the display control module 10c.

The display control module 10c controls to display, on a graph of the display 11:

the normal air pressure upper and lower limit values L1 and L2 read out from the normal air pressure storage module 10a;

the normal air pressure allowable range L which is defined by the normal air pressure upper and lower limit values L1 and L2; and the measured air pressure (245 KPa) detected by the air pressure sensors 6 to 9.

Therefore, according to the fifth embodiment, since the normal air pressure allowable range L and measured air pressure (245 KPa) are displayed on the graph by the information contents displayed on the display 11, as shown in FIG. 6, the user can easily confirm an excessive/deficient amount based on the relationship between them.

(Sixth Embodiment)

Figure 7:
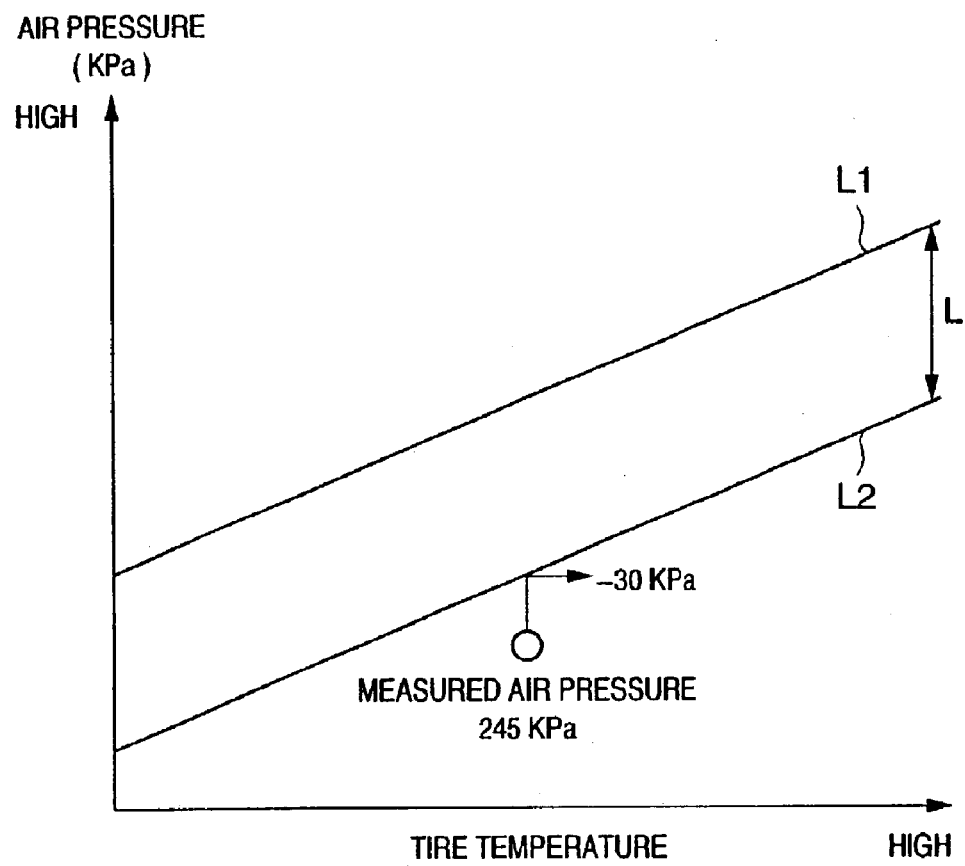
FIG. 7 shows a display example according to the sixth embodiment.

FIG. 7 shows a display example according to the sixth embodiment. According to the sixth embodiment, the display 11 displays a normal air pressure allowable range L, which is defined by normal air pressure upper and lower limit values L1 and L2, the measured air pressure, and the excessive/deficient amount on a graph in which the abscissa plots the tire air temperature and the ordinate plots the air pressure.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. Also, a normal air pressure upper limit value L1 which is set to be higher a predetermined value than a normal air pressure corresponding to each tire temperature, a normal air pressure lower limit value L2 which is set to be lower a predetermined value than a normal air pressure corresponding to each tire temperature, and a normal air pressure allowable range L which is defined by these normal air pressure upper and lower limit values L1 and L2 are read out from the normal air pressure storage module 10a.

The normal air pressure read out from the normal air pressure storage module 10a is supplied to the excessive/deficient amount calculation module 10b, which calculates an excessive/deficient amount (e.g., −30 KPa) on the basis of the measured air pressure (e.g., 245 KPa) detected by the air pressure sensors 6 to 9, and the normal air pressure read out from the normal air pressure storage module 10a.

Then, the measured air pressure detected by the air pressure sensors 6 to 9, and the normal air pressure, the normal air pressure upper and lower limit values L1 and L2, and the normal air pressure allowable range L, which are read out from the normal air pressure storage module 10a, are supplied to the display control module 10c.

The display control module 10c controls to display, on a graph of the display 11:

the normal air pressure upper and lower limit values L1 and L2 read out from the normal air pressure storage module 10a;

the normal air pressure allowable range L which is defined by the normal air pressure upper and lower limit values L1 and L2;

the excessive/deficient amount (−30 KPa) calculated by the excessive/deficient amount calculation module 10b; and the measured air pressure (245 KPa) detected by the air pressure sensors 6 to 9.

Therefore, according to the sixth embodiment, since the excessive/deficient amount (−30 KPa) is displayed on the graph in addition to the normal air pressure allowable range L and measured air pressure (245 KPa) by the information contents displayed on the display 11, as shown in FIG. 7, the user can confirm air pressure information more easily.

(Seventh Embodiment)

Figure 8:
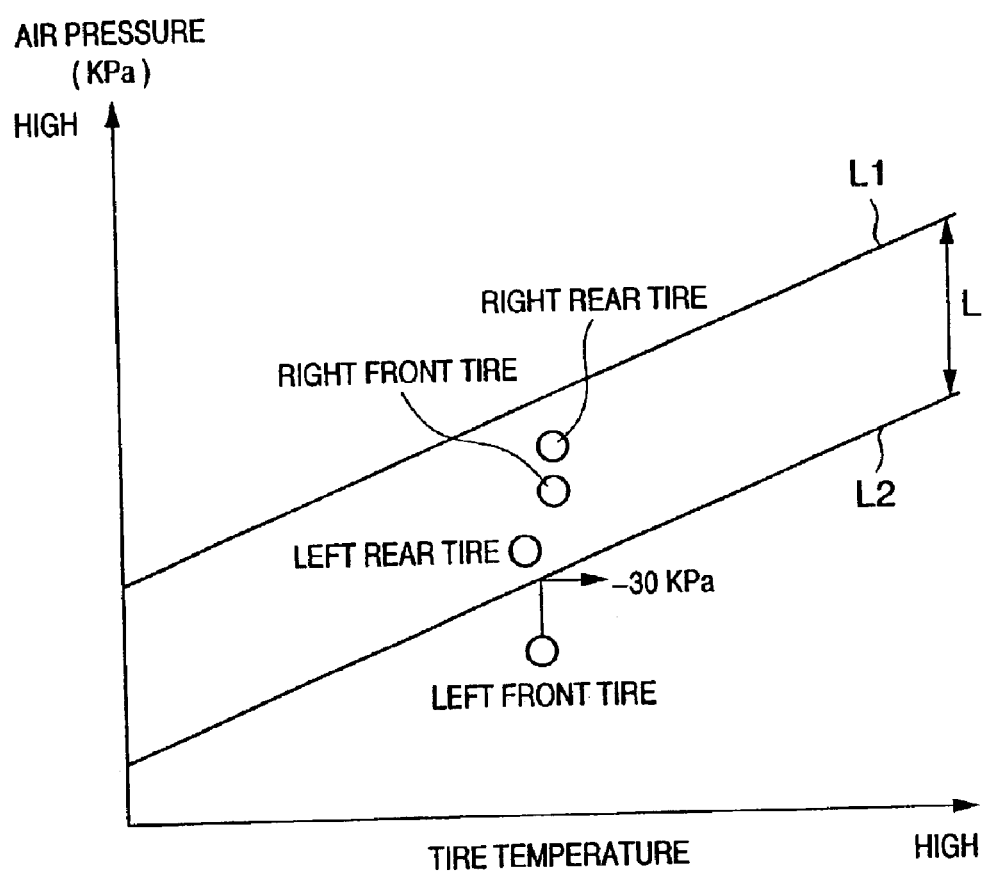
FIG. 8 shows a display example according to the seventh embodiment.

FIG. 8 shows a display example according to the seventh embodiment. According to the seventh embodiment, the display 11 displays a normal air pressure allowable range L, which is defined by normal air pressure upper and lower limit values L1 and L2, the measured air pressures for respective tires, and the excessive/deficient amount of a tire which has an excessive/deficient air pressure, on a graph in which the abscissa plots the tire air temperature and the ordinate plots the air pressure.

More specifically, the air pressure sensors 6 to 9 detect the measured air pressures and tire temperatures, and send them to the control unit 10 via their antennas 6a to 9a, the receiver 20, and the like.

In the control unit 10, a normal air pressure (e.g., 275 KPa) corresponding to the current tire temperature detected by the air pressure sensors 6 to 9 is read out from the normal air pressure storage module 10a. Also, a normal air pressure upper limit value L1 which is set to be higher a predetermined value than a normal air pressure corresponding to each tire temperature, a normal air pressure lower limit value L2 which is set to be lower a predetermined value than a normal air pressure corresponding to each tire temperature, and a normal air pressure allowable range L which is defined by these normal air pressure upper and lower limit values L1 and L2 are read out from the normal air pressure storage module 10a.

The normal air pressure read out from the normal air pressure storage module 10a is supplied to the excessive/deficient amount calculation module 10b, which calculates an excessive/deficient amount (e.g., −30 KPa) on the basis of the measured air pressure (e.g., 245 KPa) detected by one of the air pressure sensors 6 to 9, and the normal air pressure read out from the normal air pressure storage module 10a.

Then, the measured air pressures detected by the air pressure sensors 6 to 9, and the normal air pressure, the normal air pressure upper and lower limit values L1 and L2, and the normal air pressure allowable range L, which are read out from the normal air pressure storage module 10a, are supplied to the display control module 10c.

The display control module 10c controls to display, on a graph of the display 11:

the normal air pressure upper and lower limit values L1 and L2 read out from the normal air pressure storage module 10a;

the normal air pressure allowable range L which is defined by the normal air pressure upper and lower limit values L1 and L2;

the measured air pressures of the respective tires detected by the air pressure sensors 6 to 9; and the excessive/deficient amount (−30 KPa) of a tire, whose excessive/deficient amount is detected by the excessive/deficient amount calculation module 10b.

Therefore, according to the seventh embodiment, the user can quickly determine a tire position that suffers air pressure excess/deficiency, and the excessive/deficient amount of that tire on the graph by the information contents displayed on the display 11, as shown in FIG. 8.

(Eighth Embodiment)

Figure 9:
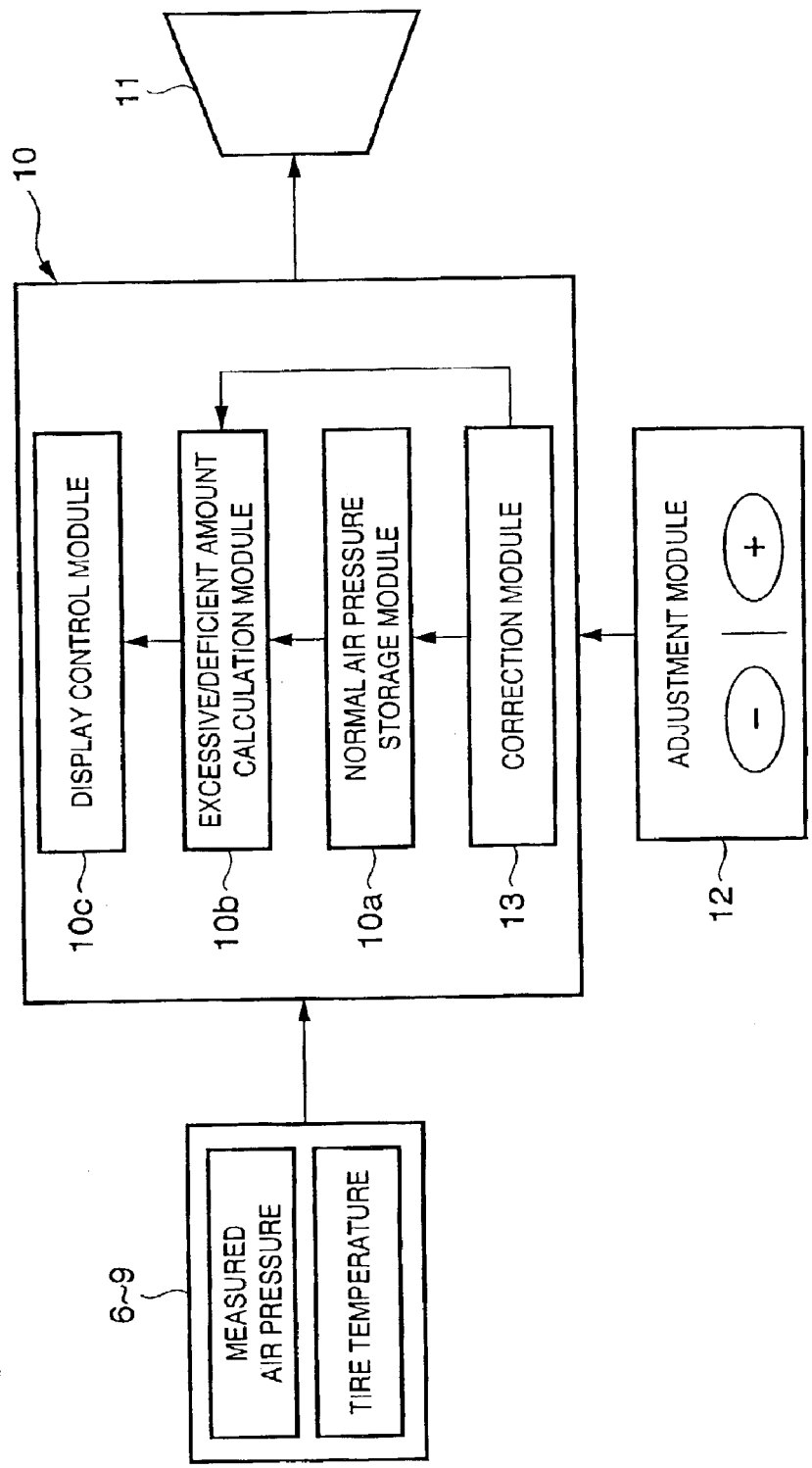
FIG. 9 is a control block diagram according to the eighth embodiment.

FIG. 9 is a control block diagram according to the eighth embodiment. The arrangements of the air pressure sensors 6 to 9, and the normal air pressure storage module 10a, excessive/deficient amount calculation module 10b, and display control module 10c in the control unit 10 are the same as those in the first to seventh embodiments, but this embodiment is different from the above embodiments in that an adjustment module 12 that allows the user to manually and arbitrarily adjust the air pressure, and a correction module 13 for correcting the calculation result of the normal air pressure storage module 10a or excessive/deficient amount calculation module 10b in correspondence with the output from the adjustment module 12 are added.

The adjustment module 12 displays an air pressure adjustment window 120 on the display 11, as shown in, e.g., FIG. 10. This air pressure adjustment window 120 includes air pressure up and down switches 12a and 12b, which allow the user to manually arbitrarily adjust the air pressure, a display field 12c for displaying the air pressure state adjusted upon operation of one of the switches 12a and 12b on the basis of the relationship between predetermined upper and lower limit values, and an alarm field 12d for displaying an alarm message when the adjusted air pressure has reached the predetermined upper or lower limit value.

The adjustment module 12 controls the operations of actuators (not shown) that adjust the air pressures of the tires 2 to 5 in accordance with user's operations using the air pressure adjustment window with the above configuration.

The correction module 13 receives an air pressure adjustment signal from the adjustment module 12, and corrects a normal air pressure stored in the normal air pressure storage module 10a or the excessive/deficient amount of the air pressure calculated by the excessive/deficient amount calculation module 10b in place of the normal air pressure.

Therefore, according to the eighth embodiment, since the normal air pressure or excessive/deficient amount is corrected according to user's requirement input via the air pressure adjustment window shown in FIG. 10, air pressure information upon correcting the air pressure can be appropriately provided according to the user's requirement.

Also, since the corrected air pressure is limited by the upper and lower limit values to fall within the predetermined range, the user can be prevented from setting too high or low an air pressure.

(Ninth Embodiment)

FIG. 11 shows a display example according to the ninth embodiment. The ninth embodiment is a modification of the eighth embodiment, and only a display method is different from the eighth embodiment.

According to the ninth embodiment, the display 11 simultaneously displays the normal air pressure corrected by the correction module 13 and air pressure adjustment information by the adjustment module 12 in addition to the excessive/deficient amount detected based on the difference between the measured air pressure detected by the air pressure sensors 6 to 9, and the normal air pressure stored in the normal air pressure storage module 10a, as shown in FIG. 11.

Therefore, according to the ninth embodiment, the user can appropriately determine the air pressure information of a tire after he or she recognizes the air pressure adjustment state, since he or she is informed of the air pressure adjustment information, i.e., information indicating if a relatively higher or lower air pressure is intentionally set, in addition to the normal air pressure and excessive/deficient amount.

(10th Embodiment)

Figure 12:
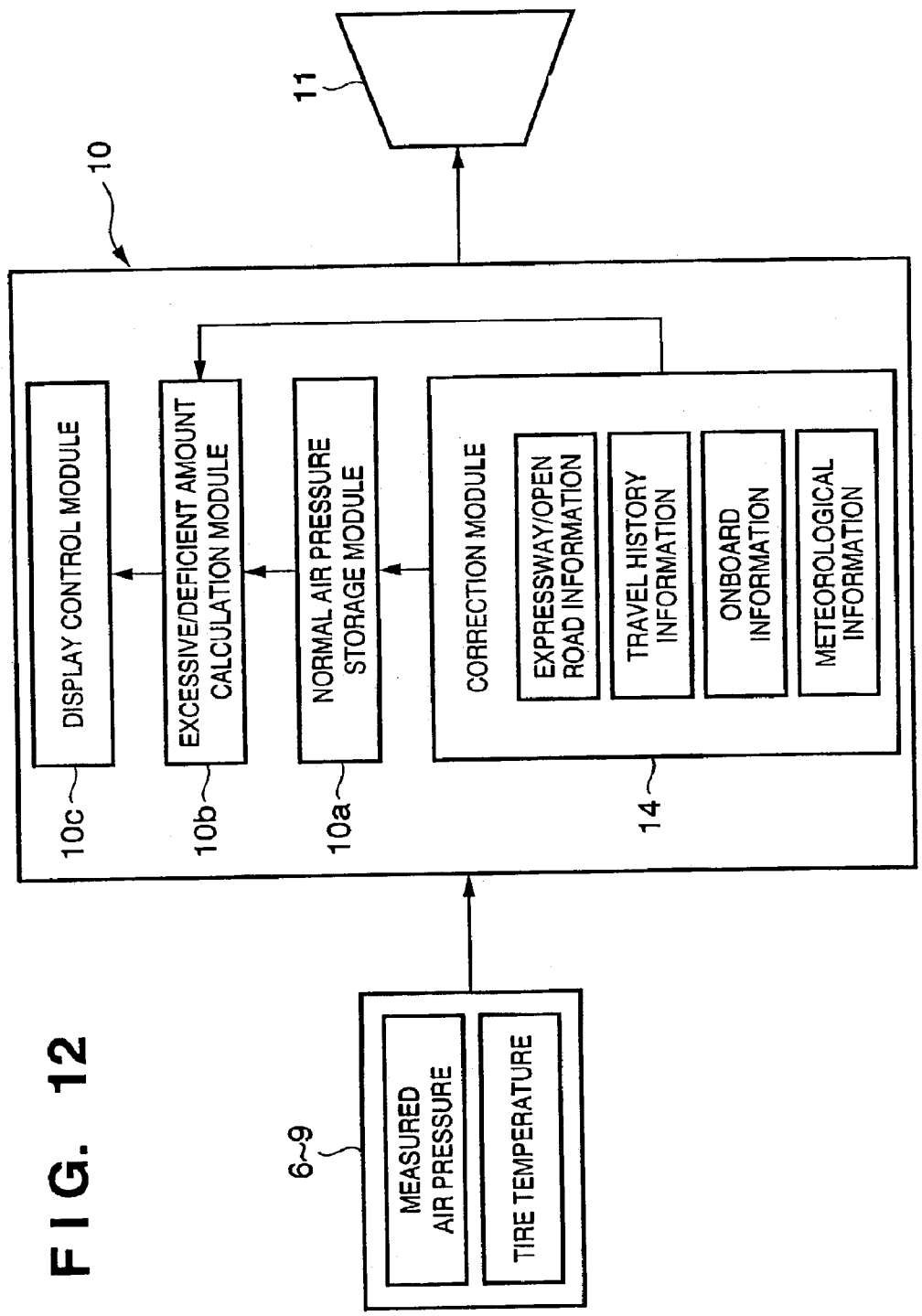
FIG. 12 is a control block diagram according to the 10th embodiment.

FIG. 12 is a control block diagram according to the 10th embodiment. The arrangements of the air pressure sensors 6 to 9, and the normal air pressure storage module 10a, excessive/deficient amount calculation module 10b, and display control module 10c in the control unit 10 are the same as those in the first to embodiments, but this embodiment is different from the above embodiments in that a correction module 14 for automatically correcting the normal air pressure of a tire in correspondence with the travel environment of the vehicle is added.

The correction module 14 acquires the type information of road (expressway, open road), travel history information, onboard information, road surface information, and meteorological information from, e.g., a navigation system, and corrects the value of the normal air pressure of a tire on the basis of various kinds of acquired information.

Therefore, according to the 10th embodiment, since the normal air pressure is corrected according to the travel environment of the vehicle, and the excessive/deficient amount from the corrected normal air pressure is displayed, the user can set an appropriate air pressure of a tire by adjusting it according to the displayed contents.

(11th Embodiment)

Figure 13:
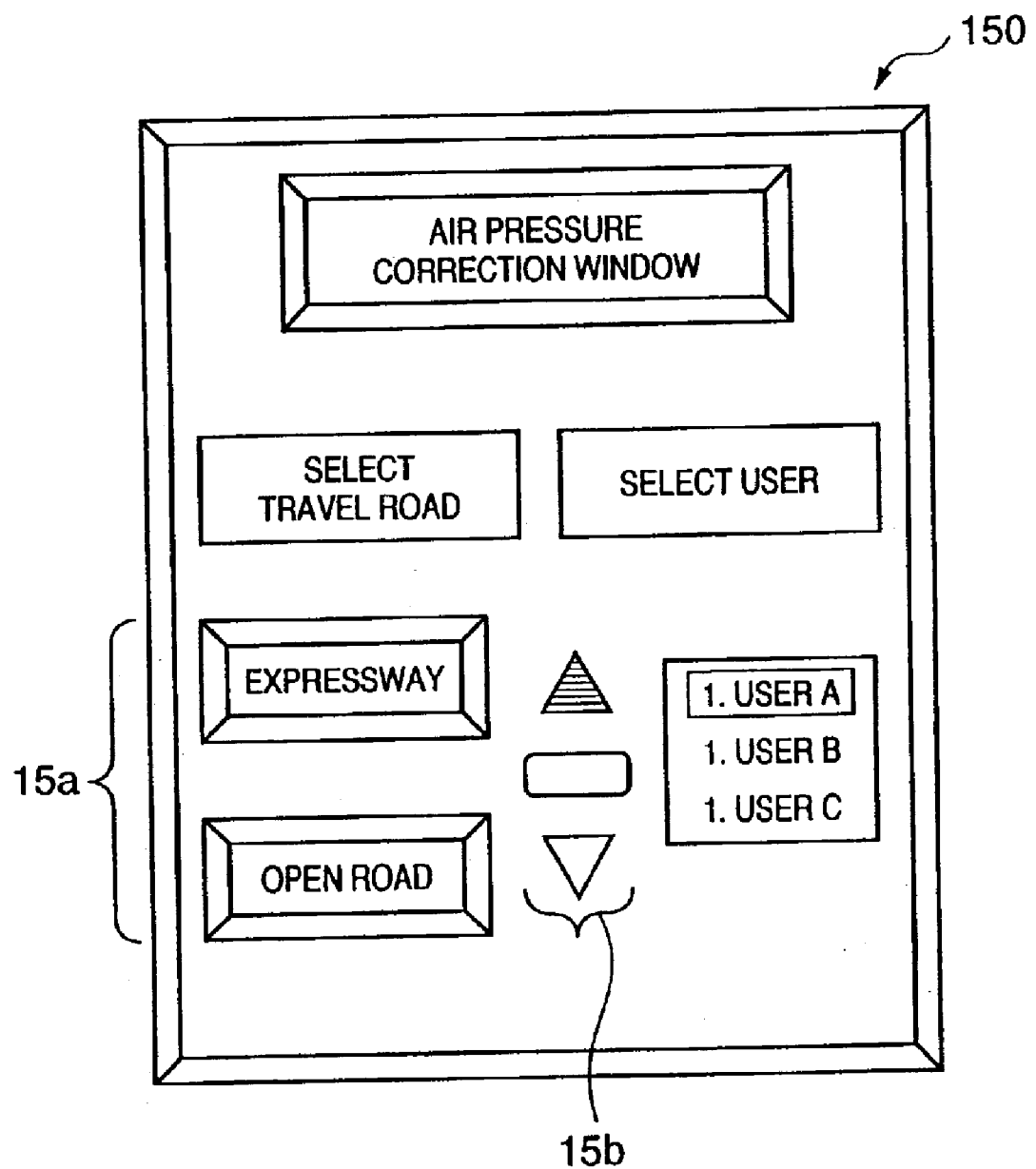
FIG. 13 shows an example of an air pressure correction window according to the 11th embodiment.

FIG. 13 shows an example of an air pressure correction window according to the 11th embodiment.

The 11th embodiment is a modification of the 10th embodiment, and comprises a manual correction module 15 that allows the user to manually correct a normal air pressure in correspondence with the travel environment of the vehicle in place of the correction module 14 of the 10th embodiment.

The manual correction module 15 displays an air pressure correction window 150 on the display 11, as shown in, e.g., FIG. 13. The air pressure correction window 150 includes a travel road select switch 15a and user-dependent select switch 15b.

The travel road select switch 15a is used to select one of an expressway and open road. In this embodiment, favorite air pressures are stored in advance for respective users, and can be set by selecting corresponding one of users.

Therefore, according to the 10th embodiment, the air pressure can be arbitrarily corrected for each user, and air pressure information upon correcting the air pressure can be normally displayed.

(12th Embodiment)

Figure 14:
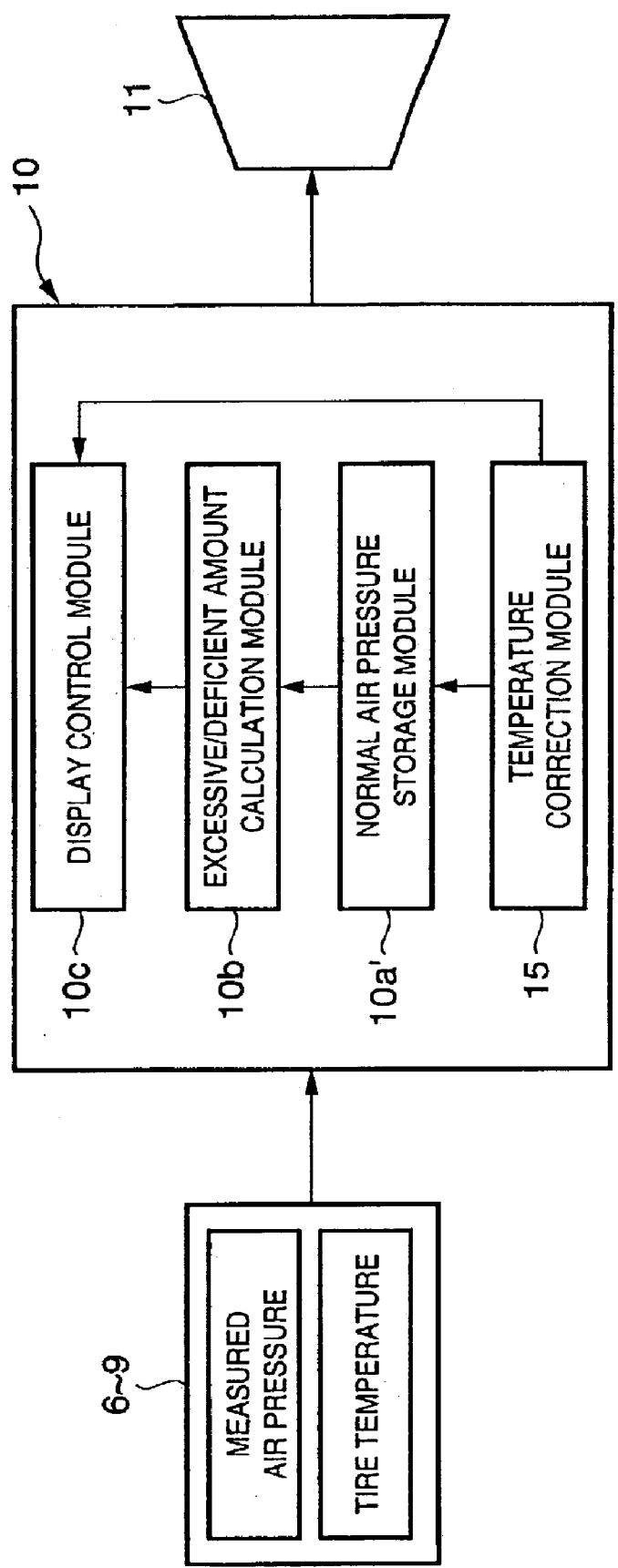
FIG. 14 is a control block diagram according to the 12th embodiment.

FIG. 14 is a control block diagram according to the 12th embodiment. The arrangements of the air pressure sensors 6 to 9, the display control module 10c and excessive/deficient amount calculation module 10b in the control unit 10, and the display 11 are the same as those in the first to embodiments, but this embodiment is different from the above first to sixth embodiments in that:

a normal air pressure storage module 10a' stores only one value (e.g., 275 KPa) of a normal air pressure correspond to a standard temperature (e.g., 20° C.);

a temperature correction module 15 for correcting the measured air pressure detected by the air pressure sensors 6 to 9 to an air pressure corresponding to the standard temperature is added; and the display control module 10c displays the tire information and information that keeps off the user from pumping air in a tire when the tire temperature is equal to or higher than a predetermined temperature at which the excessive/deficient amount from the normal air pressure becomes a predetermined value (e.g., 10%) or higher.

More specifically, the air pressure sensors 6 to 9 detect the measured air pressure and tire temperature, and send them to the control unit 10 via their antennas 6a to 9a, the receiver 20, and the like.

In the control unit 10, a normal air pressure (e.g., 275 KPa) is read out from the normal air pressure storage module 10a'. The normal air pressure read out from the normal air pressure storage module 10a is supplied to the excessive/deficient amount calculation module 10b, which calculates an excessive/deficient amount (e.g., −30 KPa) on the basis of the difference between the measured air pressure (e.g., 245 KPa) detected by the air pressure sensors 6 to 9, and the normal air pressure read out from the normal air pressure storage module 10a. The temperature correction module 15 corrects the measured air pressure detected by the air pressure sensor to an air pressure corresponding to the standard temperature on the basis of the detected tire temperature.

The tire temperature detected by the air pressure sensors 6 to 9, the excessive/deficient amount calculated by the excessive/deficient amount calculation module 10b, and the measured air pressure corrected by the temperature correction module 15 are supplied to the display control module 10c, which makes the display 11 display the measured air pressure (245 KPa) corrected by the temperature correction module 15, the tire temperature (55° C.) detected by the air pressure sensors 6 to 9, the excessive/deficient amount (−30 KPa) calculated by the excessive/deficient amount calculation module 10b, and information that keeps off the user from pumping air in a tire.

The information that keeps off the user from pumping air in a tire will be explained in detail below. This embodiment is premised on a tire which has a normal air pressure of 275 KPa when the tire temperature is equal to or lower than the standard temperature, and has temperature characteristics that the air pressure changes about 10 KPa with respect to a change in tire temperature of 10° C. When the tire temperature is equal to or higher than a predetermined temperature (20° C.+27.5° C.=47.5) corresponding to a temperature change (27.5° C.) equivalent to 10% (27.5 KPa) of the normal air pressure (275 KPa), information that keeps off the user from pumping air in that tire is displayed.

Figure 15:
FIG. 15 shows a display example according to the 12th embodiment.

In the example shown in FIG. 15, although the measured air pressure is deficient by 30 KPa from the normal air pressure of 275 KPa, since the tire temperature is 55° C. higher than the predetermined temperature (47.5), a guidance 160 is displayed as the information that keeps off the user from pumping air in a tire.

In this case, if the guidance 160 is not displayed, an air pressure lower than the normal air pressure is displayed, the user pumps air in a tire to raise the air pressure to the normal value. However, in this embodiment, since the guidance 160 is displayed as the information that keeps off the user from pumping air in a tire due to the high tire temperature, the device of this embodiment can hold the user to pump air in a tire until the tire temperature lowers.

That is, this embodiment can suppress the user from pumping air in a tire using an air pump until the air temperature displayed on the display 11 of the vehicle 1 matches air pressure information indicated by an air gauge of the air pump.

Therefore, according to the 12th embodiment, the user can be prevented from being confused when the tire air pressure information displayed on the display 11 does not match air pressure information indicated by the air pressure gauge of the air pump.

In this embodiment, the excessive/deficient amount is displayed independently of its value. Alternatively, when the excessive/deficient amount is equal to or smaller than a predetermined value (e.g., 10% of the normal air pressure) and is small, it may not be displayed, and only when the excessive/deficient amount becomes equal to or larger than the predetermined value (e.g., 10% of the normal air pressure), it may be displayed.

In this embodiment, only information indicating that a high air pressure is set by adjustment is displayed. Alternatively, the adjustment amount of the air pressure may be displayed at the same time.

In the 12th embodiment, information that keeps off the user from pumping air in a tire is displayed on the screen of a navigation system, but an alarm tone or the like may be generated to inform the user of that information.

In the 12th embodiment, the air pressure obtained by correcting the measured air pressure to an air pressure corresponding to the standard temperature is displayed on the display 11. Alternatively, the measured air temperature may be directly displayed without being corrected to an air pressure corresponding to the standard temperature.

As many apparently widely different embodiments of the present invention can be made without departing from the spirit and scope thereof, it is to be understood that the invention is not limited to the specific embodiments thereof except as defined in the claims.

What is claimed is:

1. An air pressure information display device of a vehicle tire, comprising:

detection means, attached to a vehicle tire, for detecting an actual air pressure of the tire and an actual tire temperature of the tire;

memory for storing a relationship between a desired air pressure of the tire and a desired temperature of the tire;

calculation means for calculating the desired air pressure at the actual tire temperature detected by said detection means based on the stored relationship, and calculating a difference value between the calculated desired air pressure and the actual air pressure detected by said detection means; and display means for displaying a fluctuation of the desired air pressure related to the actual tire temperature based on the relationship stored in said memory and the actual air pressure detected by said detection means, on a graph defined by the actual tire temperature and actual air pressure as parameters, wherein said display means displays the difference value calculated by said calculation means.

2. The device according to claim 1, wherein said detection means detects tire air pressure information that contains the actual tire temperature and the actual measured air pressure for the tire, and said display means displaying the difference value calculated by said calculation means, and a position of a tire where the difference value is detected.

3. The device according to claim 1, further comprising:

correction means for automatically or manually correcting the relationship stored in said memory in accordance with an environment of a vehicle.

4. An air pressure information display device of a vehicle tire, comprising:

detection means, attached to the vehicle tire, for detecting tire air pressure information that contains a detected tire temperature and a measured air pressure, and displays information associated with an actual air pressure of the tire on the basis of the air pressure information detected by the detection means;

storage means for storing a normal air pressure of a tire corresponding to a temperature of the tire;

calculation means for calculating an excessive/deficient amount from the normal air pressure on the basis of a relationship between the normal air pressure stored in said storage means and the air pressure information detected by the detection means;

display control means for controlling display means to display the excessive/deficient amount calculated by said calculation means; and correction means for correcting the normal air pressure stored in said storage means or the excessive/deficient amount calculated by said calculation means in accordance with a user's requirement.

5. The device according to claim 4, wherein said correction means limits the corrected air pressure to fall within a predetermined range.

6. An air pressure information display device of a vehicle tire, comprising:

detection means, attached to the vehicle tire, for detecting tire air pressure information that contains a detected tire temperature and a measured air pressure, and displays information associated with an actual air pressure of the tire on the basis of the air pressure information detected by the detection means;

storage means for storing a normal air pressure of a tire corresponding to a temperature of the tire;

calculation means for calculating an excessive/deficient amount from the normal air pressure on the basis of a relationship between the normal air pressure stored in said storage means and the air pressure information detected by the detection means;

display control means for controlling display means to display the excessive/deficient amount calculated by said calculation means; and correction means for automatically or manually correcting the normal air pressure stored in said storage means in accordance with a travel environment of a vehicle.

7. An air pressure information display device of a vehicle tire, which comprises detection means, attached to a vehicle tire, for detecting tire air pressure information that contains a tire temperature and measured air pressure, and displays information associated with an air pressure of the tire on the basis of the air pressure information detected by the detection means, comprising:

display control means for controlling display means to display information that keeps off the user from pumping air in a tire when the measured air pressure detected by the detection means is deficient from the normal air pressure and the tire temperature detected by the detection means is not less than a predetermined temperature.

8. An air pressure information display device of a vehicle tire, comprising:

a sensor that is attached to the vehicle tire and detects an actual air pressure and an actual tire temperature;

a storage module for storing a relationship between a desired air pressure of the tire and a temperature of the tire;

a calculation module for calculating the desired air pressure at the actual tire temperature detected by said detection means based on the stored relationship, and calculating a difference value between the calculated desired air pressure and the actual air pressure detected by said detection means; and a display module for displaying fluctuation of the desired air pressure related to the actual tire temperature based on the relationship stored in said storage module and the actual air pressure detected by said detection means, on a graph defined by the actual tire temperature and actual air pressure as parameters, wherein said display means displays the difference value calculated by said calculation means.

9. An air pressure information display device of a vehicle tire, which comprises a sensor that is attached to a vehicle tire and detects tire air pressure information that contains a tire temperature and measured air pressure, and displays information associated with an air pressure of the tire on the basis of the air pressure information detected by the sensor, comprising:

a display control module for controlling a display to display information that keeps off the user from pumping air in a tire when the measured air pressure detected by the sensor is deficient from the normal air pressure and the tire temperature detected by the sensor is not less than a predetermined temperature.

10. An air pressure information display device of a vehicle tire, comprising:

a detector to detect an actual air pressure of the tire and an actual tire temperature of the tire;

a memory to store a relationship between a desired air pressure of the tire and a desired temperature of the tire; and a display to display a fluctuation of the desired air pressure related to the actual tire temperature based on the relationship stored in said memory and the actual air pressure detected by said detector, on a graph defined by the actual tire temperature and actual air pressure.

11. The device according to claim 10, further comprising:

a calculator to calculate the desired air pressure at the actual tire temperature detected by said detector based on the stored relationship, and calculate a difference value between the calculated desired air pressure and the actual air pressure detected by said detector, wherein said display displays the difference value calculated by said calculator.

* * * * *

UNITED STATES PATENT AND TRADEMARK OFFICE
CERTIFICATE OF CORRECTION

PATENT NO. : 6,918,289 B2
DATED : July 19, 2005
INVENTOR(S) : Toshio Hayashi et al.

It is certified that error appears in the above-identified patent and that said Letters Patent is hereby corrected as shown below:

Column 4,
Line 17, delete "temperature.s" and insert -- temperature. --.

Column 5,
Line 54, before "normal" insert -- a --.

Column 14,
Line 10, before "memory" insert -- a --.

Column 16,
Line 1, after "displaying" insert -- a --.

Signed and Sealed this

Second Day of May, 2006

JON W. DUDAS
*Director of the United States Patent and Trademark Office*